United States Patent [19]

Nelson et al.

[11] 4,437,934

[45] Mar. 20, 1984

[54] METHOD FOR CONTROLLING CONSISTENCY OF TOMATO PRODUCTS

[75] Inventors: Philip E. Nelson, W. Lafayette, Ind.; Norihisa Takada, Gumma, Japan

[73] Assignee: Purdue Research Foundation, West Lafayette, Ind.

[21] Appl. No.: 417,184

[22] Filed: Sep. 13, 1982

[51] Int. Cl.³ .......................... B01D 1/00; A23L 1/212
[52] U.S. Cl. ...................................... 159/47.1; 159/44; 99/486; 364/502; 426/231; 426/615
[58] Field of Search .............. 159/1 R, 47 R, 44, 47.1; 426/492, 615, 231; 99/485, 486; 203/1-3; 364/500-502

[56] References Cited

U.S. PATENT DOCUMENTS

| | | | |
|---|---|---|---|
| 1,402,136 | 1/1922 | Beatty | 426/615 |
| 3,118,775 | 1/1964 | Byer et al. | 426/492 |
| 3,172,770 | 3/1965 | Miller | 426/492 |
| 3,250,312 | 5/1966 | Irvin | 203/3 |
| 3,309,287 | 3/1967 | Lupfer et al. | 203/3 |
| 3,399,064 | 8/1968 | Partyka et al. | 426/615 |
| 3,549,384 | 12/1970 | Walker et al. | 426/615 |
| 3,873,753 | 3/1975 | Nelson et al. | 426/615 |
| 3,899,386 | 8/1975 | Komiyama et al. | 159/47.1 |

FOREIGN PATENT DOCUMENTS

| | | | |
|---|---|---|---|
| 101882 | 9/1937 | Australia | 426/492 |
| 248482 | 4/1971 | U.S.S.R. | 426/615 |
| 646976 | 2/1979 | U.S.S.R. | 426/615 |

Primary Examiner—Wilbur L. Bascomb, Jr.
Attorney, Agent, or Firm—Barnes & Thornburg

[57] ABSTRACT

A process for manufacturing tomato products to an established consistency standard by introducing a tomato extract feedstock having an initial precipitate weight ratio and an initial Brix level into a system, measuring these initial conditions of the feedstock, calculating an expected precipitate weight ratio of the tomato selected for manufacture from the feedstock, computing an expected Brix level of the tomato product, which may be done by comparing the initial precipitate weight ratio and Brix level of feedstock and the expected precipitate weight ratio of the tomato product to a programmed relationship between the initial precipitate weight ratio, the initial Brix level, the expected precipitate weight ratio and an expected Brix level of the tomato product to establish this expected Brix level of tomato product and concentrating the tomato extract feedstock until the expected Brix level is achieved. The process represents an improvement over the prior art by enabling tomato processors to use in-line measurement to monitor the consistency of the tomato product being produced.

9 Claims, 9 Drawing Figures

METHOD FOR CONTROLLING CONSISTENCY OF TOMATO PRODUCTS

The present invention relates generally to food processes, compositions, and products, and more particularly, to tomato-based food products and processes for controlling the consistency of such food products.

Millions of tons of tomatoes are processed annually into canned whole tomatoes, juice, catsup, puree, paste, sauce, and other tomato products. There are seasonal restrictions in processing tomatoes. During the short harvest season, which typically is approximately forty to sixty days long, the tomato industry processes raw tomatoes to both final products and partially processed products for storage. Aseptic bulk storage systems have been developed to store a large amount of partially processed products in the form of tomato paste, puree, or juice, resulting in an increased processing efficiency. While processers usually prefer to manufacture their final products from fresh, recently harvested tomatoes, an increasing number of processers are using concentrated tomato paste for manufacture of their final products. This is especially true where the tomato industries are located away from efficient tomato-producing areas and where the product such as sauce and catsup is, theoretically, subject to appropriate quality controls.

Particularly in recent years in response to demonstrated customer preference, the tomato industry has tended toward the manufacture of very thick tomato catsup and other tomato products. This practice inevitably forces the processer to be more concerned with the yield, since the thicker products require more tomato solids than the conventional type. Both self-imposed and governmentally imposed standards often require that the tomato product exhibit the required consistency in the absence of any starches or other thickening agents, and thus the consistency of the tomato product largely depends upon the amount of tomato solids used in each product.

The grades of tomato catsup and sauce are ascertained by judging such characteristics as color, consistency, absence of defects, and flavor. "Consistency" refers to the apparent viscosity of the product and the tendency of the product to hold its liquid portion without separation. While it is assumed that the measured consistency of tomato products largely depends on the amount of solids used in the product, there does not appear to be any simple direct correlation between the amount of tomato solids and the consistency, since the various tomato products are thixotropic in nature. Further, the addition of sugar (sucrose) in those products which require it, such as catsup, seems to have little effect on measured consistency.

To measure consistency, commercial industries employ the Bostwick consistometer which in fact measures a flow property of a viscous tomato product. The operational aspects of the Bostwick consistometer are well known. Although other devices such as a potentiometric rotary viscometer, a tube viscometer, and an efflux tube viscometer have been investigated for measurement of flow properties of viscous products, the Bostwick consistometer is still used as the standard measuring device. The efflux tube viscometer is used on occasion to measure the so-called Libby's viscosity. Neither the Bostwick consistometer nor the efflux tube viscometer are usable as a continuous on-line evaluative apparatus, nor does it appear that either could be used as a means for continuously controlling the processing of tomato products.

It is therefore an object of the present invention to provide a method of reliably predicting the consistency of a final tomato product, based on measurements of characteristics of the tomato feed stock. It is a further object of the present invention to continuously monitor and control the consistency of the final tomato product with the aid of information gained from a measurement of selected characteristics of the tomato feed stock.

A wide variety of physical factors were investigated by the present invention as possible candidates for measuring indirectly the consistency of tomato products. The investigation included an empirical study of the various characteristics shown in Table I of tomato puree of known origin. The correlation coefficients of each pair of characteristics was established and, surprisingly, the absolute value of the precipitate weight ratio (as defined below) exhibited the highest correlation.

TABLE I

Correlation Coefficients Between Consistency Factors of Tomato Concentrate

| | Bostwick Consistency | Total Solids | Soluble Solids | Water Insoluble Solids | Alcohol Insoluble Solids | Serum Viscosity |
|---|---|---|---|---|---|---|
| Total Solids | −.7514 | | | | | |
| Soluble Solids | −.7859 | .9196 | | | | |
| Water Insoluble Solids | −.4069 | .7415 | .4229 | | | |
| Alcohol Insoluble Solids | −.7024 | .8464 | .6687 | .8295 | | |
| Serum Viscosity | −.9342 | .5657 | .6400 | .2334 | .5552 | |
| Precipitate Weight Ratio | −.9360 | .7798 | .8510 | .3762 | .7023 | .9319 |

From other studies it has been determined that the objects of the present invention are satisfied by measuring both the precipitate weight ratio and the Brix level of the tomato feed stock. The precipitate weight ratio of the final product desired to be produced is established either empirically or based on economic, quality standards, or other considerations. The Brix level of the tomato product desired to be produced can be calculated from the information thus gained and the processing of the tomato be continued until the calculated Brix level is achieved, whereupon the processing is terminated.

The precipitate weight ratio can be determined by centrifugation of a sample of the tomato feed stock, preferably at a centrifugal acceleration greater than 2,240 g's, to form a compact, form-stable precipitate. The weight of the precipitate is then compared to the original sample weight in a ratio, and the ratio is expressed in terms of a percent.

The Brix level of the tomato feed stock and the finished tomato product can be measured in a continuous fashion with any of several devices, the preferred being a refractometer. The information gained on precipitate weight ratio and Brix level can be processed periodically or continuously with the aid of a special purpose microcomputer programmed as outlined below. The output of the special purpose computer can be used to control the concentration process so as to achieve the desired consistency in the tomato product sought to be produced, and in this way obtain the optimum amount of tomato product from the selected feed stock.

The process of the present invention can be used in the processing of raw tomatoes to both final products and partially processed products adapted for storage and use in later production. The process can also be used in the production of final tomato products from tomato intermediates such as pastes or purees which have been previously manufactured with or without the aid of the present invention. The process of the present invention permits the use of a wide variety of feed stock materials for the production of a single product with the desired consistency regardless of the starting material. Tomatoes of various cultivars, or even of unknown cultivar, can be used, yet the consistency of the product maintained.

Other various features and advantages of the present invention will become apparent to those skilled in the art upon consideration of the following description. A preferred embodiment of the present invention is illustrated in the accompanying figures exemplifying the best mode of carrying out the invention as presently perceived, in which:

Figure 1:
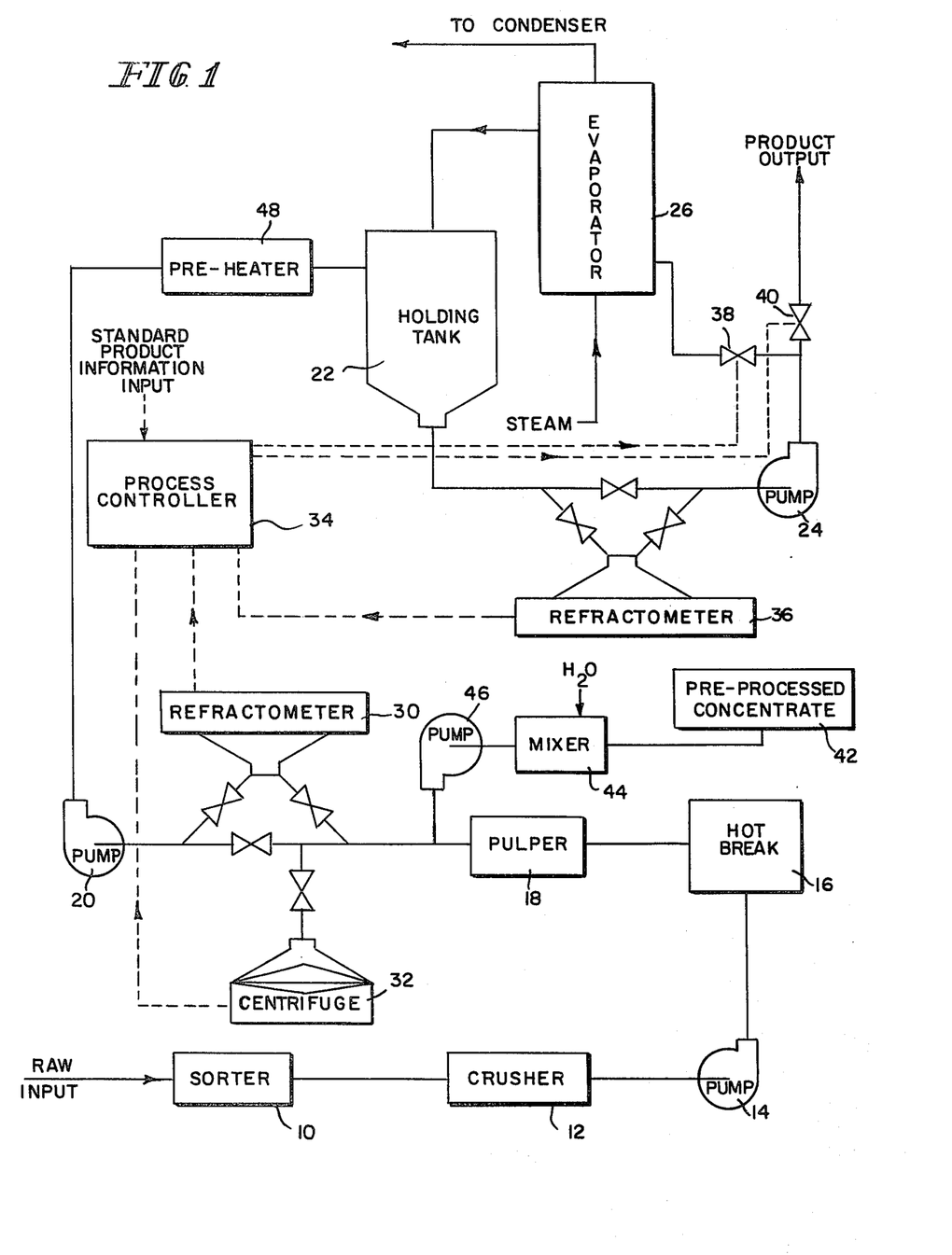
FIG. 1 is a schematic illustration of a process employing the present invention.

The preliminary steps in making catsup, puree, and other tomato products are similar, and are illustrated generally in FIG. 1. Fresh raw tomatoes are washed and sorted by hand or with the aid of a sorter 10. At this time, defective tomatoes may be rejected or trimmed. Thereafter, the tomatoes are normally chopped or crushed by a crusher 12 such that the chopped or crushed tomato product is able to pass through a coarse screen having openings typically of about one centimeter. The material passing through the screen, generally referred to as a tomato macerate, is then immediately pumped by pump 14 into a container, such as a rotary coil kettle, and heated in a hot break area 16. The hot break can occur in a steam-injection system at a temperature of about 90° to 110° C. with the macerate being held at this temperature for approximately one minute.

Following the hot break, the macerate is forwarded to a pulper 18 where the macerate is caused to pass through a finer screen to remove seeds and skins, the screen typically having openings of about 0.6 millimeter to form a tomato extract.

The extract is thereafter pumped by pump 20 to a concentration or holding tank 22. The extract is then cycled from holding tank 22 by pump 24 through an evaporator 26 until the extract achieves the desired concentration. When the extract achieves the desired concentration, the concentrated extract is then pumped by pump 24 into an asceptic storage area, or to a canning area, or to a cooking area if the product, such as catsup, so requires.

In accordance with the present invention, various measurements are made in order to ensure reliable consistency in the product output by such a system. In order to determine the initial characteristics of the tomato input, a selected sample portion of the extract emerging from pulper 18 is passed through refractometer 30 in which the Brix level of the extract is measured. A hydrometer calibrated in Brix degrees can be used to measure the extract in place of the refractometer 30. Simultaneously, another selected and measured portion of the extract is introduced into centrifuge 32 where the precipate weight ratio of the extract is measured. The information from both refractometer 30 and centrifuge 32 is introduced into process controller 34 which also receives information concerning the desired product standard in terms of the precipitate weight ratio elected to be achieved in the product to be produced. A second hydrometer or refractometer 36 is provided between holding tank 22 and the product output. A selected fraction of the extract as it undergoes concentration is analyzed by refractometer 36, again for the purpose of measuring the Brix level of the extract undergoing concentration. This information is also fed to process controller 34. As the extract undergoes concentration, the Brix level measured in refractometer 36 will increase until the desired Brix level is achieved, whereupon the evaporative process is terminated and the product output to the next stage. So long as the Brix level measured by refractometer 36 is less than that established by process controller 34 as being desirable in the output product, valve 38 remains in an open condition, while valve 40 remains in a closed condition. At such time as the Brix level measured by refractometer 36 achieves the desired level, valve 38 closes and valve 40 opens. It will be appreciated that other valve manipulations may take place simultaneously with the change in state of valves 38 and 40.

Alternatively, the apparatus shown in FIG. 1 could be modified by eliminating refractometer 30 and moving centrifuge 32 to a position relative to refractometer 36 identical that shown relative to refractometer 30. The holding tank 22 is then filled with extract processed as before and heated to a prescribed initial temperature by preheater 48. Pump 24 is actuated with valve 38 open and valve 40 closed, and the initial readings of Brix level and precipitate weight ratio are taken by refractometer 36 and moved centrifuge 32, respectively. The initial readings are fed to process controller 34. Steam is then admitted to the coils of evaporator 26 and the Brix level of the circulating product monitored. At such time as the Brix level achieves the point calculated by the process controller 34 to be correct for the desired product, valve 38 is closed and valve 40 opened to forward the product to the next processing stage.

It will also be appreciated that while the foregoing discussion has focussed on the use of raw tomatoes as the input to the process of the manufacturing tomato products, the process also lends itself to the use of previously processed tomato extracts. For example, in the manufacture of a pizza sauce, a preprocessed tomato concentrate such as a tomato paste from source 42 can be resuspended and diluted with water in mixer 44. The blended and diluted tomato paste is then pumped by pump 46 past the initial feed stock analysis area containing refractometer 30 and centrifuge 32. Thereafter, the blended concentrate is treated just as any other tomato extract, except that it may be subject to a preheater 48 prior to entering holding tank 22 so as to ensure the proper thermal conditions for measurement at refractometer 36. Other variations in this basic system are expected, depending upon the particular tomato product sought to be produced, and the system illusrated in FIG. 1 is merely illustrative and not intended to be all encompassing.

Figure 2:
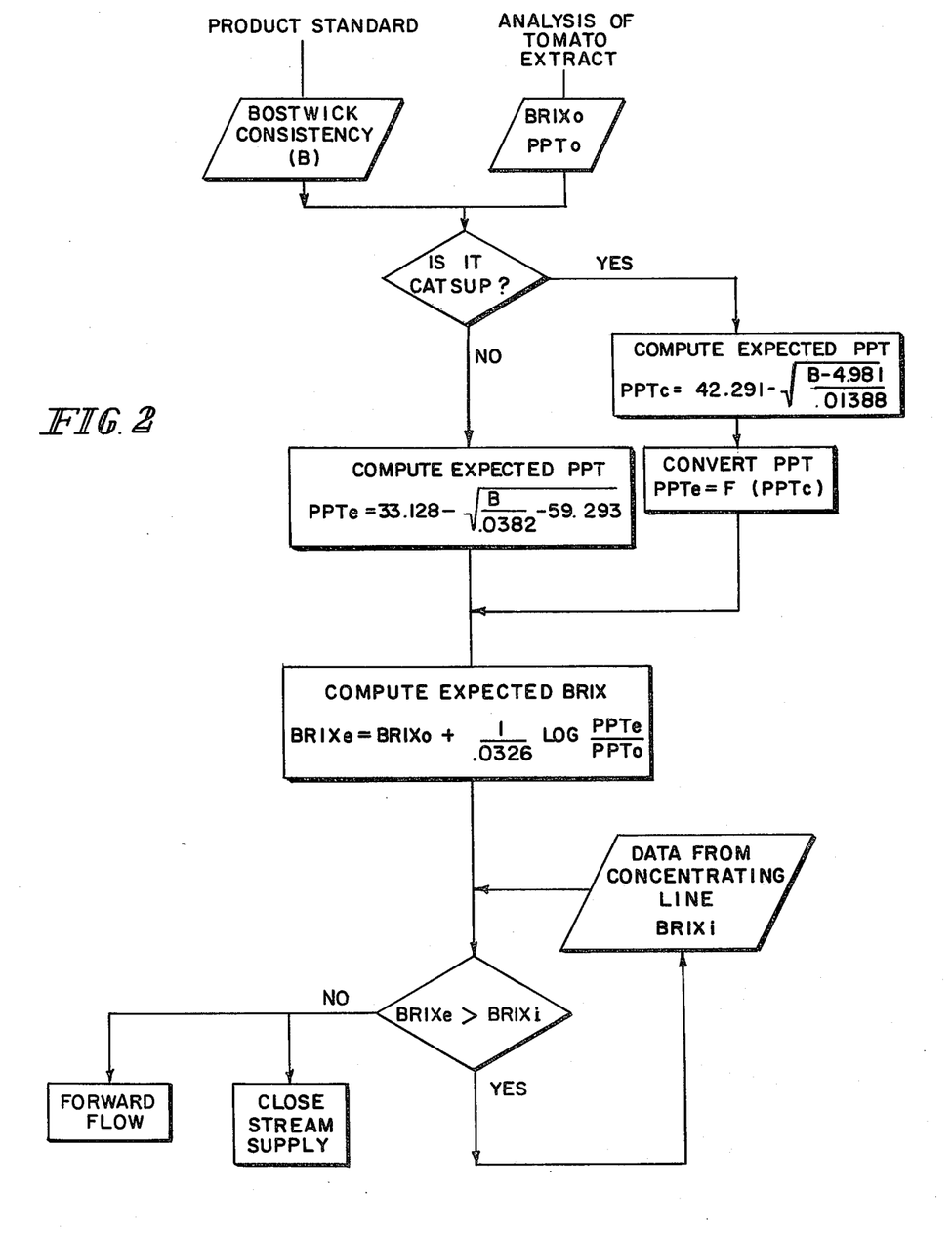
FIG. 2 is a flow diagram showing the calculation steps taken by a process controller.

The process controller 34 of FIG. 1 can be any of a number of devices, including either a general purpose or special purpose computer. The flow diagram for the logic of the process controller 34 is shown in FIG. 2. The information concerning the standard for the product sought to be produced is introduced in terms of Bostwick consistency reading. The Bostwick consistency standard is employed since most commercial manufacturers define their consistency standards in terms of Bostwick consistency readings. The process controller then calculates the expected precipitate weight ratio of an output product having such a Bostwick consistency. This calculation is conducted from formulaes which are empirically derived.

To empirically derive the formulaes, a number of studies were undertaken. Among these was a study of the measured precipitate weight ratios from seventeen samples of tomato puree of known origin, each sample having been adjusted to a 10.0° Brix level. The results of the precipitate weight ratio measurements are graphically shown in FIG. 3.

Figures 3, 5, 6:
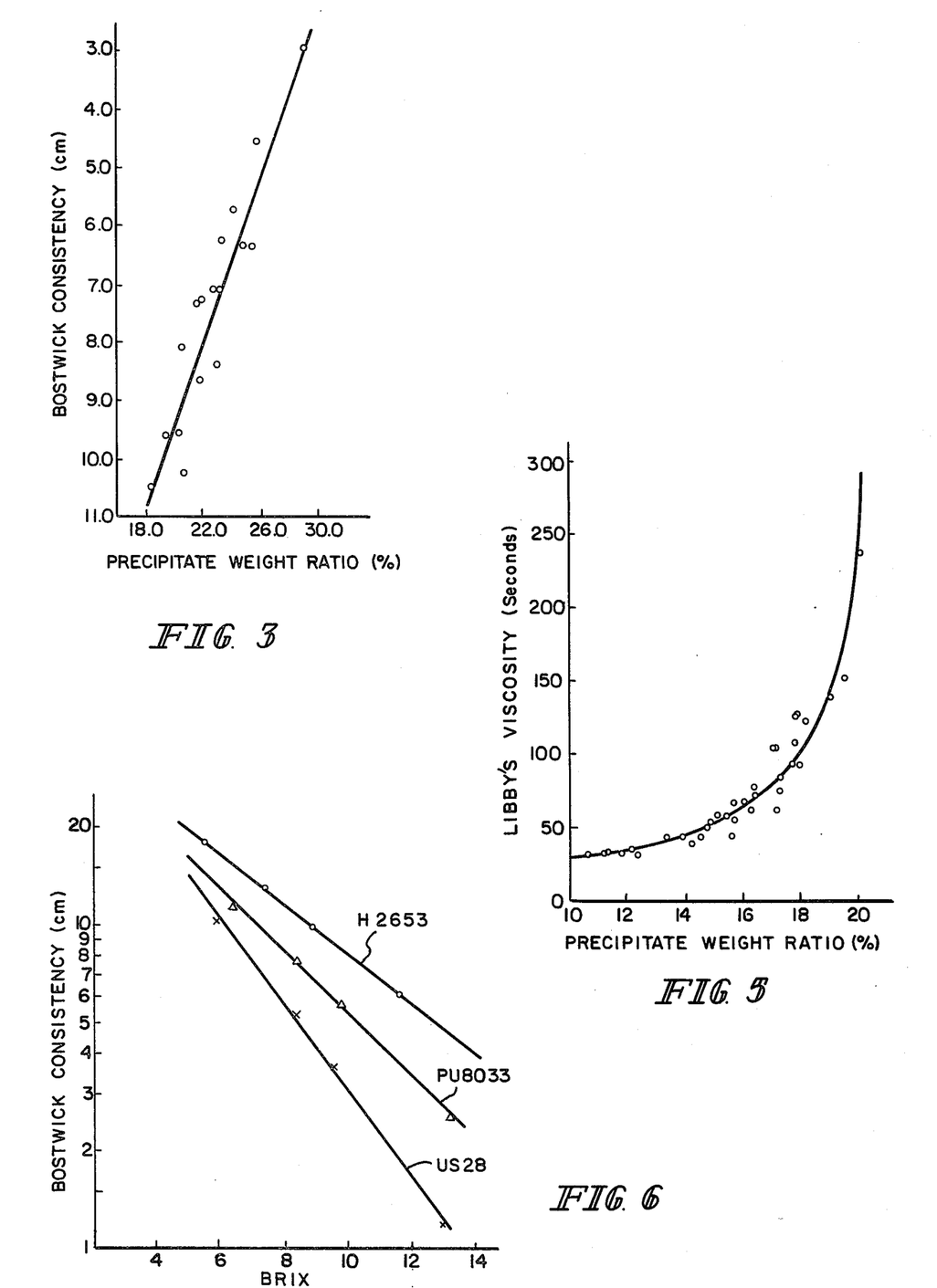
FIG. 3 is a graph of consistency as a function of precipitate weight ratio as measured on 17 samples of tomato puree at a Brix level of 10.0°.
FIG. 5 is a graph of an alternate scale of consistency as a function of precipitate weight ratio as measured on some of the samples previously measured in connection with FIG. 4.
FIG. 6 is a graph of consistency as a function of concentration of three selected samples.
Figure 4:
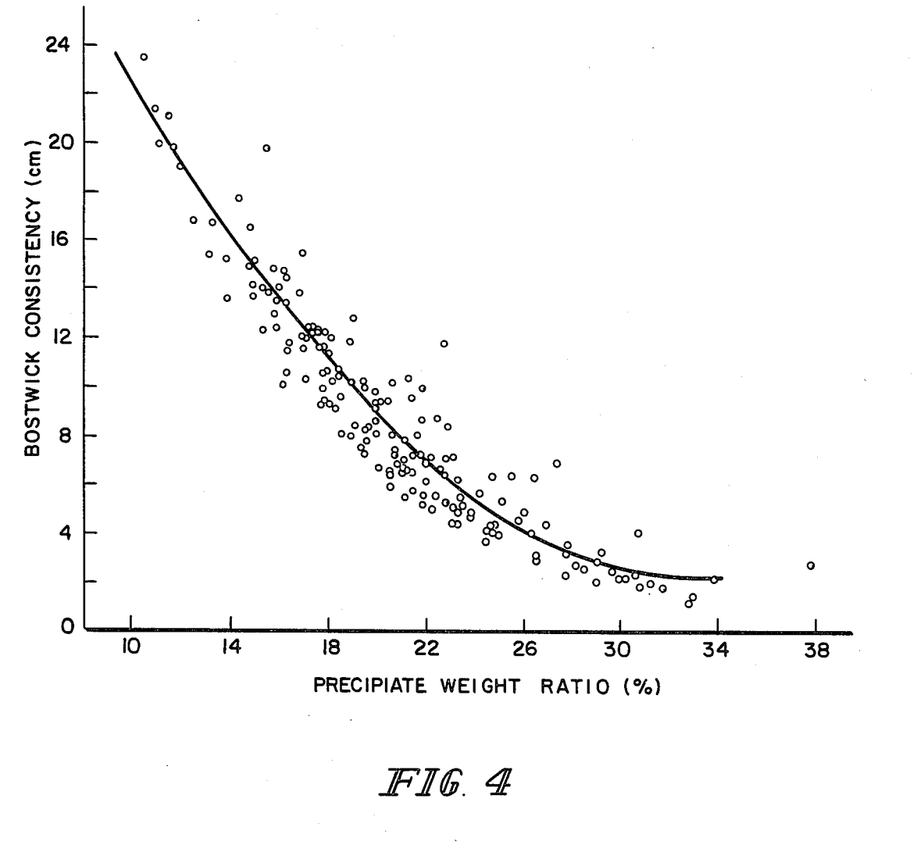
FIG. 4 is a graph of consistency as a function of precipitate weight ratio as measured on more than 130 various tomato products.

Since commercial tomato products have various Brix levels, the relationship associated with FIG. 3 cannot be employed in the process controller of the present invention. Rather, a more complete relationship accounting for various Brix levels is required. For this purpose, more than 130 additional samples were analyzed. They included 21 commercial tomato puree or paste samples of which the processing methods and cultivars of raw tomatoes were unknown, 11 single strength tomato juices samples, and 104 tomato concentrate samples prepared from various known cultivars. The Brix levels of these samples varied from approximately 5° to 18°. In spite of the various cultivars, Brix levels, and processing methods, the various tomato products show a very high correlation between precipitate weight ratio and Bostwick consistency as shown in FIG. 4. The products analyzed did not include tomato catsup as will be explained later.

From the data shown in FIG. 4, it has been determined that the relationship between Bostwick consistency (BOST) and precipitate weight ratio (PPTe) for tomato products can be expressed as:

$$PPTe = 33.128 - \sqrt{(BOST/.0382) - 59.293} \quad \text{(Eq. 1)}$$

The presence of this relationship and its high reliability is all the more surprising in view of the various cultivars, Brix levels, and processing methods used in the production of the various tomato products included in this sample. Not only does the precipitate weight ratio correlate highly with the Bostwick consistency values, but it also correlates highly with the Libby's viscosity measurements for various tomato juices as shown in FIG. 5. The relationship between precipitate weight ratio (PPTe) and Libby's viscosity (LIBV) can be expressed as:

$$PPTe = 21.12 \times (1 - (15.31/LIBV)) \quad \text{(Eq. 2)}$$

Thus, while the program for the process controller 34 as shown in the flow chart in FIG. 2 indicates product standard input information in terms of Bostwick consistency, the product standard could also use the Libby's viscosity value by substitution of the relation of Equation 2. In either event, the process controller is able to directly make appropriate computations for measuring and controlling product consistency. As indicated by FIG. 2, other considerations may also follow, based on the particular tomato product sought to be produced.

In order to fully understand the importance of the next computational step as shown in the flow diagram of FIG. 2, it may be convenient to consider the following table of examples which were achieved by crushing 50 pounds of tomatoes from each of 21 cultivars through a 0.95 centimeter screen. The macerate of each of the 21 cultivars was separately heated to a boiling temperature in a steam-jacketed open kettle. The macerate was then passed through a 0.584 millimeter screen to remove seeds and skins and thereby form an extract which in each case was of a single cultivar. A portion of the extract was packed in a 303×406 enameled can and cooled in ice water. The rest of the extract was concentrated in a steam-jacketed vacuum kettle at 60°–65° C. The concentrates at three different Brix levels were packed in similar enameled cans and cooled in ice water. These samples were analyzed within the same day of processing. The Brix level, Bostwick consistency, and precipate weight ratio were determined for all samples as shown in Table II.

TABLE II

| Example Number | Cultivar | Brix (°) | Bostwick Consistency (cm) | Precipitate Weight Ratio (%) |
|---|---|---|---|---|
| 1a | Campbell-28 | 6.0 | 19.8 | 15.59 |
| 1b | | 7.6 | 14.9 | 15.94 |
| 1c | | 10.7 | 7.9 | 21.27 |
| 1d | | 13.7 | 4.9 | 26.13 |
| 2a | Campbell-37 | 6.0 | 14.1 | 16.06 |
| 2b | | 8.1 | 9.2 | 18.32 |

TABLE II-continued

| Example Number | Cultivar | Brix (°) | Bostwick Consistency (cm) | Precipitate Weight Ratio (%) |
|---|---|---|---|---|
| 2c | | 10.8 | 5.1 | 23.15 |
| 2d | | 15.3 | 1.9 | 31.72 |
| 3a | Delaware | 6.1 | 11.7 | 17.85 |
| 3b | | 8.2 | 6.7 | 21.10 |
| 3c | | 9.8 | 4.7 | 23.91 |
| 3d | | 12.3 | 2.5 | 29.62 |
| 4a | E. Red Rock | 5.9 | 12.3 | 17.73 |
| 4b | | 8.1 | 7.3 | 20.77 |
| 4c | | 9.7 | 5.2 | 23.64 |
| 4d | | 13.2 | 2.0 | 31.23 |
| 5a | H722 | 6.5 | 9.9 | 20.06 |
| 5b | | 8.0 | 7.1 | 21.17 |
| 5c | | 10.0 | 4.3 | 24.62 |
| 5d | | 13.8 | 1.4 | 33.09 |
| 6a | H2653 | 5.4 | 17.8 | 14.53 |
| 6b | | 7.3 | 13.0 | 15.95 |
| 6c | | 8.8 | 10.0 | 17.81 |
| 6d | | 11.5 | 6.2 | 22.06 |
| 7a | IND792 | 6.6 | 11.9 | 19.02 |
| 7b | | 9.2 | 7.2 | 22.31 |
| 7c | | 10.6 | 5.4 | 25.26 |
| 7d | | 14.3 | 2.2 | 33.79 |
| 8a | Knox | 5.8 | 15.5 | 17.14 |
| 8b | | 7.8 | 10.7 | 18.16 |
| 8c | | 8.5 | 10.3 | 18.26 |
| 8d | | 10.6 | 6.5 | 22.85 |
| 9a | Ohio 7663 | 5.6 | 13.9 | 16.98 |
| 9b | | 7.7 | 8.5 | 19.20 |
| 9c | | 10.7 | 4.4 | 24.80 |
| 9d | | 13.0 | 2.8 | 28.17 |
| 10a | Ohio 7681 | 5.4 | 14.5 | 16.39 |
| 10b | | 7.2 | 10.4 | 17.21 |
| 10c | | 9.0 | 6.9 | 20.93 |
| 10d | | 11.5 | 4.4 | 24.77 |
| 11a | Ohio 7814 | 6.0 | 11.4 | 18.17 |
| 11b | | 7.7 | 8.4 | 19.75 |
| 11c | | 9.8 | 4.9 | 23.96 |
| 11d | | 12.9 | 2.4 | 30.60 |
| 12a | Peto 80 | 5.5 | 15.2 | 15.09 |
| 12b | | 7.0 | 12.3 | 15.37 |
| 12c | | 9.0 | 7.6 | 19.35 |
| 12d | | 10.3 | 6.6 | 21.25 |
| 13a | PU 7955 | 5.8 | 14.8 | 16.33 |
| 13b | | 7.6 | 9.4 | 18.14 |
| 13c | | 9.8 | 5.6 | 22.52 |
| 13d | | 12.8 | 3.6 | 27.97 |
| 14a | PU 8026 | 5.9 | 11.7 | 17.81 |
| 14b | | 7.8 | 8.1 | 18.99 |
| 14c | | 8.9 | 6.6 | 20.68 |
| 14d | | 13.5 | 2.2 | 30.20 |
| 15a | PU 8033 | 6.3 | 11.6 | 17.07 |
| 15b | | 8.3 | 7.9 | 19.59 |
| 15c | | 9.7 | 5.8 | 21.56 |
| 15d | | 13.2 | 2.6 | 28.51 |
| 16a | PU 8062 | 5.6 | 12.0 | 17.17 |
| 16b | | 8.0 | 6.4 | 20.60 |
| 16c | | 9.2 | 4.5 | 23.13 |
| 16d | | 11.8 | 2.1 | 28.96 |
| 17a | Red Rock | 5.8 | 12.3 | 17.89 |
| 17b | | 7.8 | 8.1 | 19.09 |
| 17c | | 9.4 | 5.6 | 22.09 |
| 17d | | 11.9 | 3.2 | 27.87 |
| 18a | Redgold Special | 5.9 | 13.9 | 15.71 |
| 18b | | 8.2 | 8.0 | 18.60 |
| 18c | | 9.7 | 6.0 | 20.62 |
| 18d | | 14.4 | 1.9 | 30.84 |
| 19a | Tipton | 5.3 | 16.6 | 14.93 |
| 19b | | 6.9 | 10.6 | 16.40 |
| 19c | | 9.0 | 6.8 | 20.17 |
| 19d | | 11.4 | 4.0 | 25.05 |
| 20a | US 28 | 5.8 | 10.3 | 19.50 |
| 20b | | 8.3 | 5.3 | 22.91 |
| 20c | | 9.5 | 3.7 | 24.46 |
| 20d | | 13.0 | 1.2 | 32.77 |
| 21a | US 141 | 5.7 | 12.5 | 17.31 |
| 21b | | 6.8 | 9.3 | 17.70 |
| 21c | | 9.2 | 5.2 | 21.89 |
| 21d | | 11.7 | 2.9 | 26.49 |

A graphical comparison between Bostwick consistency and Brix level for three of the examples as shown in FIG. 6 reveals that the log of the Bostwick values changed linearly with respect to the Brix level during concentration. Each cultivar generated a different curve with both the slope and intercept constants of the linear regression lines being significantly different. While only Examples 6, 15, and 20 are illustrated in FIG. 6, similar behavior is exhibited for all 21 cultivars tested.

Figures 7, 8:
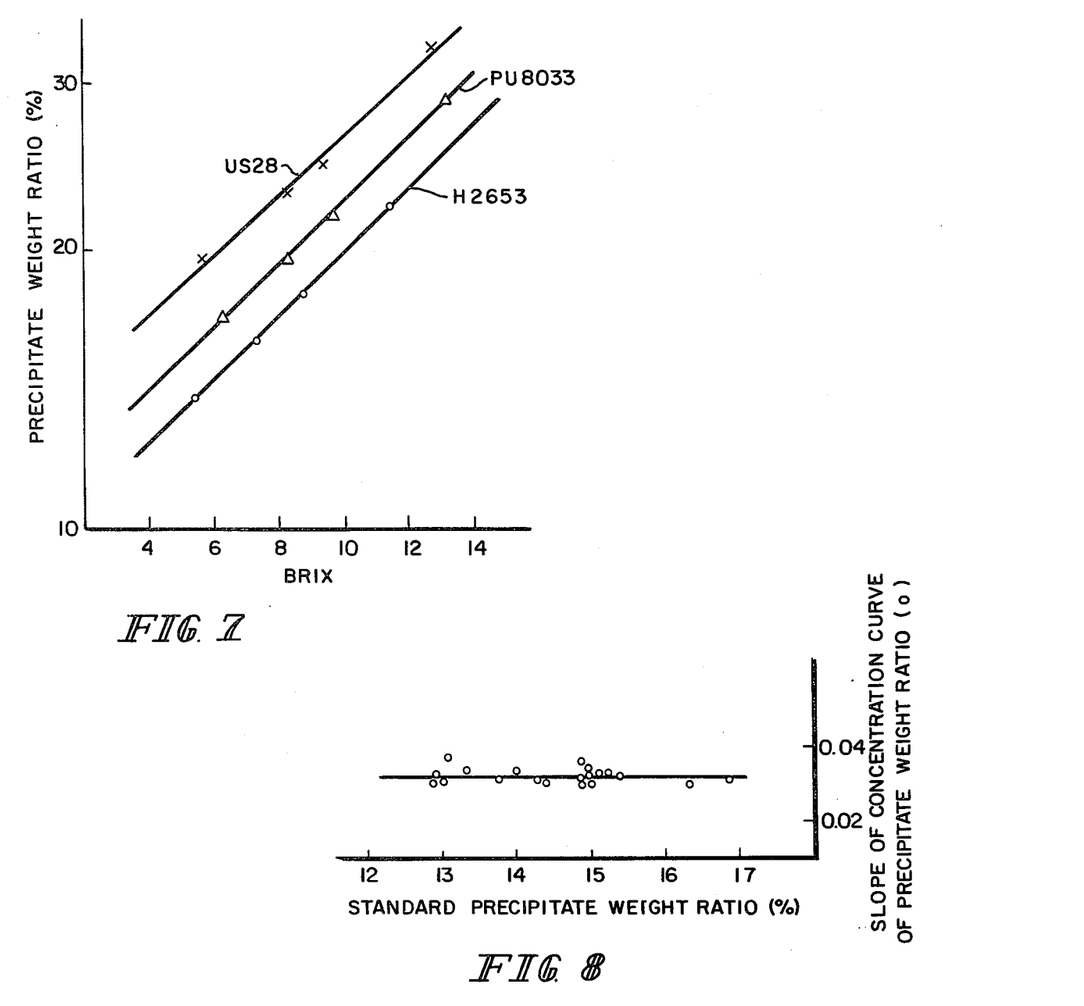
FIG. 7 is a graph of precipitate weight ratio as a function of concentration of the same 3 samples shown in FIG. 6.
FIG. 8 is a graph of the slope of the calculated regression for 21 cultivars at a normalized Brix level of 4.0°.

A similar comparison of precipitate weight ratio and Brix level as shown in FIG. 7 reveals that the log of the precipitate weight ratio also changed linearly with respect to the Brix level during concentration. It is surprising to find, however, that the slope of the concentration curves of different cultivars were similar if not identical. It is noted, however, that the intercepts for each cultivar were significantly different. Again, FIG. 7 illustrates only Examples 6, 15, and 20, but a similar treatment of the remaining examples reveals substantially the same result.

This similarity of result is shown graphically in FIG. 8 where the slope of the concentration curve of precipitate weight ratio as shown in FIG. 7 for all 21 cultivars tested was compared against the precipitate weight ratio at a Brix level of 4°. As shown in FIG. 8, the average slope of the regeneration lines of precipitate weight ratio for all 21 cultivars was 0.0326.

It is therefore possible to define a general concentration curve irrespective of source of tomato product as:

$$\log Y = 0.0326\, X + C \tag{Eq. 3}$$

where Y is the precipitate weight ratio and X is the Brix level. This equation can be reliably used to predict the concentration behavior of any tomato product regardless of cultivar. This surprising relation permits the computation and hence control of conditions during a concentration process by merely comparing the initial conditions of a tomato extract feed stock and the final conditions desired in a tomato product to be produced. That is, the initial relation of a given tomato extract will fit an initial condition equation by appropriate adjustment of the constant C in the relation:

$$\log (PPTo) = 0.0326\, (BRIXo) + C \tag{Eq. 4}$$

Likewise, the expected conditions for the same material once concentrated can be expressed as:

$$\log (PPTe) = 0.0326\, (BRIXe) + C \tag{Eq. 5}$$

where the value of C is identical. The subtraction of one equation from the other reveals the following relation:

$$\log (PPTe) - \log (PPTo) = 0.0326\, (BRIXe - BRIXo) \tag{Eq. 6}$$

which may be also expressed as:

$$\log (PPTe/PPTo) = 0.0326\, (BRIXe - BRIXo) \tag{Eq. 7}$$

which in turn may be solved for the expected Brix level and expressed in the form shown in FIG. 2.

$$BRIXe = BRIXo + (1/0.0326) \log (PPTe/PPTo) \tag{Eq. 8}$$

It is important to realize that this relationship is uniform, regardless of the tomato product to be produced and regardless of whether the Bostwick consistency or Libby's viscosity standards for the product to be produced are employed. As indicated in FIG. 2, once the expected Brix level has been computed, it is merely necessary then to monitor the Brix level in the concentrating line with the aid of an appropriate instrument such as refractometer 36 shown in FIG. 1 to accurately and predictably make uniform the consistency of the output product.

As indicated in FIG. 2, some variation of the process, and in particular of the computation of the expected precipitate weight ratio from either the Bostwick consistency or Libby's viscosity standard, must be made where the product sought to be produced is catsup. This is in general true where the make-up of the tomato product is other than merely tomatoes and instead includes other items such as salt, sugar, spices, or other food solids which do not match the behavior of tomatoes alone. It will also be appreciated that in the manufacture of tomato catsup, for example, the process illustrated in FIG. 1 is augmented by a cooking step and a finishing step not shown in FIG. 1. In this instance, the refractometer 36 would not necessarily be positioned as shown in FIG. 1, but rather would preferably be positioned somewhat later in the process control steps immediately prior to the point in the process where the catsup is fed into a holding tank which would supply a filling machine. This modification permits the accurate control of the catsup immediately prior to its bottling, thus ensuring customer satisfaction as regards reliable product consistency.

Figure 9:
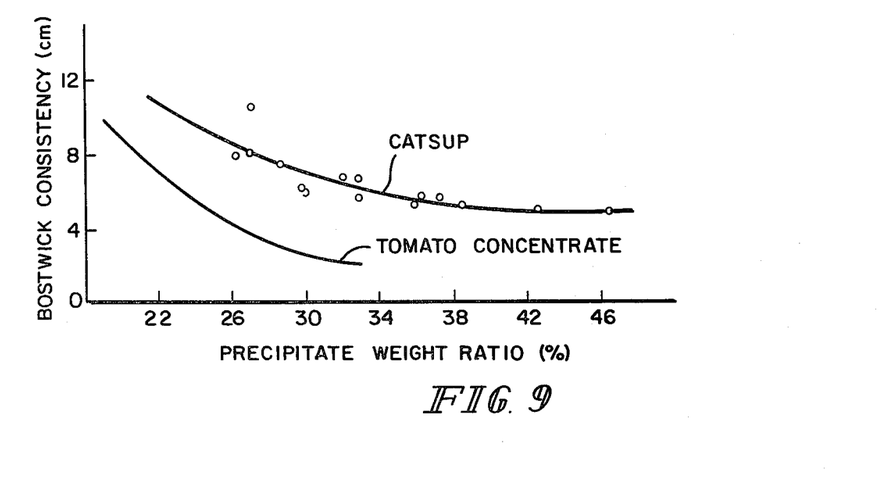
FIG. 9 is a graph similar to FIG. 4 of consistency as a function of precipitate weight ratio as measured of 15 samples of tomato catsup.

The relationship shown in FIG. 2 is derived from an analysis of the empirical relation shown in FIG. 9 similar to that which resulted from the analysis of the data shown in FIG. 4. It will be appreciated that other similar relationships can be empirically derived for other products whose principal ingredient is tomatoes but includes other non-tomato products, examples of which are pizza sauce, spaghetti sauce, and the like. In the particular case of catsup, the relationship is as follows:

$$PPTe = 42.291 - \sqrt{(B - 4.981)/.01388} \tag{Eq. 9}$$

Thus, in accordance with the present invention, various tomato-based products can be controllably produced by measuring the initial feedstock consistency and Brix level characteristics, calculating the desired Brix level in the final product based on the measured initial characteristics and a final product quality criterion (Bostwick consistency, Libby's viscosity, or the like), and concentrating the feedstock until the calculated Brix level is achieved.

The following illustrative examples are presented to further exemplify the invention.

EXAMPLE 22

A tomato puree having a Bostwick consistency standard of 4.0 cm was manufactured from 1,000 liters of tomato juice of cultivar H2653 having an initial Brix level of 5.5° and an initial precipitate weight ratio of 14.0%.

Using Equation 1, the expected precipitate weight ratio for a product having a 4.0 cm Bostwick consistency was calculated to be 26.4%.

Using Equation 8, the final Brix level was calculated to be 13.95°. The juice was concentrated to the indicated Brix level and the Bostwick consistency of the product was measured. The measured Bostwick consistency was within acceptable variation from the product standard.

Also, from the ratio of the beginning to ending Brix levels, the amount of final product was predicted to be 1,000 liters×(5.5/13.95)=394.3 liters.

The amount of final product was measured and determined to be within measurement error of the predicted amount.

EXAMPLE 23

A tomato catsup having a Bostwick consistency standard of 6.5 cm was manufactured from commercial tomato paste by first diluting the paste with water to form a puree of 12° Brix. Sucrose was added to raise the Brix level of the puree to 33°. Acetic acid was added at a volume ratio of 170 millimeters per liter. The initial precipitate weight ratio was measured to be 26.37%.

Using Equation 9, the expected precipitate weight ratio for the final product was calculated to be 31.8%. Using Equation 8, the final Brix level was calculated to be 35.5°.

The product was preheated to 60° C. with a plate heat exchanger and then rapidly heated to 137.8° C. in a steam injector and flashed in a vacuum vessel under 23 inches of vacuum which produced the desired Brix level.

The consistency of the final product was measured to be 6.3 cm, which is within acceptable variation from the product standard.

While the invention has been disclosed with reference to the foregoing examples and preferred embodiments, other variations of the invention will be apparent to those skilled in the art, which variations are within the scope of the appended claims.

What is claimed is:

1. A process for manufacturing tomato products to an established consistency standard, comprising the steps of:
   introducing into a system a tomato extract feedstock having an initial precipitate weight ratio and an initial Brix level,
   measuring the initial precipitate weight ratio and initial Brix level of the tomato extract feedstock,
   calculating an expected precipitate weight ratio of the tomato product selected for manufacture from the tomato extract feedstock,
   computing an expected Brix level of the tomato product selected for manufacture from the tomato extract feedstock, and
   concentrating the tomato extract feedstock while measuring the Brix level thereof until the expected Brix level is achieved.

2. A process for manufacturing tomato products to an established consistency standard, comprising the steps of:
   introducing into a system a tomato extract feedstock having an initial precipitate weight ratio and an initial Brix level,
   measuring the initial precipitate weight ratio and the initial Brix level of the tomato extract feedstock,
   calculating an expected precipitate weight ratio of the tomato product selected for manufacture from the tomato extract feedstock,
   comparing the initial precipitate weight ratio and the initial Brix level of the tomato extract feedstock and the expected precipitate weight ratio of the tomato product selected for manufacture to a programmed relationship between the initial precipitate weight ratio, the initial Brix level, the expected precipitate weight ratio, and an expected Brix level of the tomato product selected for manufacture from the tomato extract to establish the expected Brix level of the tomato product selected for manufacture, and
   concentrating the tomato extract feedstock until the expected Brix level is achieved.

3. The process of claim 2 wherein the step of concentrating the tomato extract until the expected Brix level is achieved includes the step of measuring the Brix level of the tomato extract feedstock in the system at a point in the system prior to a point where the tomato extract feedstock is released from the system as manufactured tomato product.

4. The process of claim 3 wherein the step of measuring the Brix level of the tomato extract feedstock at a point in the system prior to a point where the tomato extract is released from the system comprises the step of
   measuring the Brix level with an in-line refractometer which selectively samples the tomato extract feedstock as it is being manufactured by the system.

5. The process of claim 2 wherein the step of concentrating the tomato extract feedstock until the expected Brix level is achieved comprises the step of
   measuring the Brix level of the tomato extract feedstock in the system at a point in the system prior to a point where the tomato extract feedstock is released from the system as manufactured tomato product,
   comparing the measured Brix level with the expected Brix level using a computer,
   automatically preferentially selecting either to continue concentrating the tomato extract feedstock if the measured Brix level is less than the expected Brix level or to release the manufactured tomato product from the system if the measured Brix level is at least equivalent to the expected Brix level.

6. The process of claim 2 wherein the programmed relationship is $$\log Y = 0.0326X + C$$

where Y is the expected precipitate weight ratio, X is the expected Brix level, and C is a constant derived from the measurement of the initial precipitate weight ratio and the initial Brix level of the tomato extract feedstock introduced into the system.

7. The process of claim 6 wherein the constant C is derived from the initial precipitate weight ratio and the initial Brix level through the equation $$\log (PPTo) = 0.0326 (BRIXo) + C$$

where PPTo is the initial precipitate weight ratio and BRIXo is the initial Brix level of the tomato extract feedstock introduced into the system.

8. The process of claim 2 wherein the step of calculating said expected precipitate weight ratio of the tomato product selected for manufacture from the tomato extract feedstock comprises the step of calculating with a computer programmed with the relation $$PPTe = 21.12 \times (1 - (15.41/LIBV))$$

where
   PPTe is the expected precipitate weight ratio and

LIBV is the Libby's viscosity of the tomato product selected for manufacture.

9. The process of claim 2 wherein the step of calculating said expected precipitate weight ratio of the tomato product selected for manufacture from the tomato extract feedstock comprises the step of calculating with a computer programmed with the relation $$PPTe = 33.128 - (BOST/0.0382) - 59.293$$

where
PPTe is the expected precipitate weight ratio and
BOST is the Bostwick consistency of the tomato product selected for manufacture.

* * * * *

UNITED STATES PATENT AND TRADEMARK OFFICE
CERTIFICATE OF CORRECTION

PATENT NO. : 4,437,934
DATED : March 20, 1984
INVENTOR(S) : Philip E. Nelson et al It is certified that error appears in the above-identified patent and that said Letters Patent is hereby corrected as shown below:

Column 4, line 34, "precipate" should be --precipitate--.

Column 6, line 58, "precipate" should be --precipitate--.

Column 9, line 27, "regeneration" should be --regression--.

Signed and Sealed this

Nineteenth Day of March 1985

[SEAL]

Attest:

DONALD J. QUIGG

Attesting Officer        Acting Commissioner of Patents and Trademarks